(12) United States Patent
Denenberg et al.

(10) Patent No.: US 10,887,579 B2
(45) Date of Patent: Jan. 5, 2021

(54) DEPTH-SENSING COMPUTER VISION SYSTEM

(71) Applicants: Scott Denenberg, Newton, MA (US); Lev Persits, Cambridge, MA (US); Clara Vu, Cambridge, MA (US); Robert Craig Randall, Newton, MA (US); Patrick Sobalvarro, Harvard, MA (US); Valentina Chamorro, Somerville, MA (US); Gene Malkin, Brookline, MA (US); Alberto Moel, Cambridge, MA (US)

(72) Inventors: Scott Denenberg, Newton, MA (US); Lev Persits, Cambridge, MA (US); Clara Vu, Cambridge, MA (US); Robert Craig Randall, Newton, MA (US); Patrick Sobalvarro, Harvard, MA (US); Valentina Chamorro, Somerville, MA (US); Gene Malkin, Brookline, MA (US); Alberto Moel, Cambridge, MA (US)

(73) Assignee: VEO ROBOTICS, INC., Waltham, MA (US)

(*) Notice: Subject to any disclaimer, the term of this patent is extended or adjusted under 35 U.S.C. 154(b) by 0 days.

(21) Appl. No.: 16/553,727

(22) Filed: Aug. 28, 2019

(65) Prior Publication Data
US 2020/0077074 A1    Mar. 5, 2020

Related U.S. Application Data

(60) Provisional application No. 62/724,941, filed on Aug. 30, 2018.

(51) Int. Cl.
*H04N 13/246* (2018.01)
*G06T 7/80* (2017.01)
(Continued)

(52) U.S. Cl.
CPC ............ *H04N 13/246* (2018.05); *G06T 7/85* (2017.01); *H04N 5/357* (2013.01);
(Continued)

(58) Field of Classification Search
CPC .. H04N 13/246; H04N 13/194; H04N 13/254; H04N 13/271; G06T 7/85
(Continued)

(56) References Cited

U.S. PATENT DOCUMENTS

| 6,243,165 B1 | 6/2001 | Norita et al. |
| 9,137,511 B1 | 9/2015 | LeGrand et al. |

(Continued)

FOREIGN PATENT DOCUMENTS

| CN | 105527585 A | 4/2016 |
| JP | 2018-004570 A | 1/2018 |
| KR | 10-1826711 B1 | 2/2018 |

OTHER PUBLICATIONS

International Search Report and Written Opinion for Corresponding International Application PCT/US2019/048518 dated Dec. 13, 2019 11 pages.
(Continued)

*Primary Examiner* — On S Mung
(74) *Attorney, Agent, or Firm* — Morgan, Lewis & Bockius LLP

(57) ABSTRACT

Systems and methods for calibrating a sensor array for 3D depth sensing include the steps of providing multiple 3D sensors each for (i) illuminating a field of view of the sensor and (ii) generating an output array of pixelwise values indicative of distances to objects within the illuminated a field of view; sequentially causing each of the 3D sensors to generate an output array while other 3D sensors are illuminating their fields of view; and creating an interference matrix from the generated output arrays, the interference
(Continued)

matrix indicating, for each of the 3D sensors, a degree of interference by other 3D sensors simultaneously active therewith.

15 Claims, 2 Drawing Sheets

(51) Int. Cl.

| | | |
|---|---|---|
| *H04N 13/194* | (2018.01) | |
| *H04N 13/254* | (2018.01) | |
| *H04N 13/271* | (2018.01) | |
| *H04N 5/357* | (2011.01) | |
| *H04N 13/204* | (2018.01) | |
| *G01K 13/00* | (2006.01) | |
| *H04N 13/00* | (2018.01) | |

(52) U.S. Cl.
CPC ......... *H04N 13/194* (2018.05); *H04N 13/204* (2018.05); *H04N 13/254* (2018.05); *H04N 13/271* (2018.05); *G01K 13/00* (2013.01); *H04N 2013/0081* (2013.01)

(58) Field of Classification Search
USPC .......................................................... 348/47
See application file for complete search history.

(56) References Cited

U.S. PATENT DOCUMENTS

| | | |
|---|---|---|
| 9,452,531 B2 | 9/2016 | Kikkeri et al. |
| 9,866,740 B2 | 1/2018 | Lewkow et al. |
| 9,979,953 B1 | 5/2018 | Marason et al. |
| 10,445,944 B2 | 10/2019 | Galera et al. |
| 2003/0235335 A1 | 12/2003 | Yukhin et al. |
| 2010/0146333 A1 | 6/2010 | Yong et al. |
| 2010/0166294 A1 | 7/2010 | Marrion et al. |
| 2012/0098935 A1 | 4/2012 | Schmidt et al. |
| 2015/0358594 A1 | 12/2015 | Marshall et al. |
| 2016/0140817 A1 | 5/2016 | Beagle et al. |
| 2016/0354927 A1 | 12/2016 | Kikkeri et al. |
| 2017/0302905 A1 | 10/2017 | Shteinfeld et al. |
| 2018/0059224 A1 | 3/2018 | Wang |
| 2018/0089847 A1 | 3/2018 | Lee et al. |
| 2018/0106891 A1* | 4/2018 | Thurner ................. G01S 7/497 |
| 2018/0309970 A1 | 10/2018 | Gupta et al. |
| 2018/0374239 A1 | 12/2018 | Wallack et al. |
| 2019/0294918 A1 | 9/2019 | Witchey et al. |
| 2019/0392595 A1 | 12/2019 | Uhlenbrock et al. |

OTHER PUBLICATIONS

United States Office Action for U.S. Appl. No. 16/553,724, dated May 21, 2020, 19 pages.
United States Office Action for U.S. Appl. No. 16/553,729, dated May 26, 2020, 14 pages.

* cited by examiner

DEPTH-SENSING COMPUTER VISION SYSTEM

CROSS-REFERENCE TO RELATED APPLICATION

This application claims priority to and the benefit of, and incorporates herein by reference in its entirety, U.S. Provisional Patent Application No. 62/724,941, filed on Aug. 30, 2018.

FIELD OF THE INVENTION

The field of the invention relates, generally, to monitoring of industrial environments where humans and machinery interact or come into proximity, and in particular to systems and methods for detecting unsafe conditions in a monitored workspace.

BACKGROUND

Industrial machinery is often dangerous to humans. Some machinery is dangerous unless it is completely shut down, while other machinery may have a variety of operating states, some of which are hazardous and some of which are not. In some cases, the degree of hazard may depend on the location or distance of the human with respect to the machinery. As a result, many "guarding" approaches have been developed to separate humans and machines and to prevent machinery from causing harm to humans. One very simple and common type of guarding is simply a cage that surrounds the machinery, configured such that opening the door of the cage causes an electrical circuit to place the machinery in a safe state. If the door is placed sufficiently far from the machinery to ensure that the human can't reach it before it shuts down, this ensures that humans can never approach the machinery while it is operating. Of course, this prevents all interaction between human and machine, and severely constrains use of the workspace.

The problem is exacerbated if not only humans but also the machinery (e.g., a robot) can move within the workspace. Both may change position and configuration in rapid and uneven ways. Typical industrial robots are stationary, but nonetheless have powerful arms that can cause injury over a wide "envelope" of possible movement trajectories. Additionally, robots are often mounted on a rail or other type of external axis, and additional machinery is often incorporated into the robot's end effector, both of which increase the effective total envelope of the robot.

Sensors such as light curtains can be substituted for cages or other physical barriers, providing alternative methods to prevent humans and machinery from coming into contact. Sensors such as two-dimensional (2D) light detection and ranging (LIDAR) sensors can provide more sophisticated capabilities, such as allowing the industrial machinery or robot to slow down or issue a warning when an intrusion is detected in an outer zone and stop only when an intrusion is detected in an inner zone. Additionally, a system using a 2D LIDAR can define multiple zones in a variety of shapes.

Because human safety is at stake, guarding equipment must typically comply with stringent industry standards regarding functional safety, such as ISO 13849, IEC 61508, and IEC 62061. These standards specify maximum failure rates for hardware components and define rigorous development practices for both hardware and software components that must be complied with in order for a system to be considered safe for use in industrial settings.

Such systems must ensure that dangerous conditions and system failures can be detected with very high probability, and that the system responds to such events by transitioning the equipment being controlled into a safe state. For example, a system that detects zone intrusion may be biased toward registering an intrusion, i.e., risking false positives in order to avoid the hazardous consequences of a false negative.

One new class of sensor that shows significant promise for use in machine guarding provides three-dimensional (3D) depth information. Examples of such sensors include 3D time-of-flight cameras, 3D LIDAR, and stereo vision cameras. These sensors offer the ability to detect and locate intrusions into the area surrounding industrial machinery in 3D, which has several advantages over 2D systems. In particular, for complex workcells it can be very difficult to determine a combination of 2D planes that effectively covers the entire space for monitoring purposes; 3D sensors, properly configured, can alleviate this issue.

For example, a 2D LIDAR system guarding the floorspace of an industrial robot will have to preemptively stop the robot when an intrusion is detected well beyond an arm's-length distance away from the robot (the "Protective Separation Distance" or PSD), because if the intrusion represents a person's legs, that person's arms could be much closer and would be undetectable by the 2D LIDAR system. For sensors that cannot detect arms or hands, the PSD has an extra term called the intrusion distance that is typically set to 850 mm. A 3D system, by contrast, can allow the robot to continue to operate until the person actually stretches his or her arm towards the robot. This provides a much tighter interlock between the actions of the machine and the actions of the human, which avoids premature or unnecessary shut-downs, facilitates many new safe applications and workcell designs, and saves space on the factory floor (which is always at a premium).

Another application of 3D sensing involves tasks that are best achieved by humans and machines working collaboratively together. Humans and machines have very different strengths and weaknesses. Typically, machines may be stronger, faster, more precise, and offer greater repeatability. Humans have flexibility, dexterity, and judgment far beyond the abilities of even the most advanced machines. An example of a collaborative application is the installation of a dashboard in a car—the dashboard is heavy and difficult for a human to maneuver, but attaching it requires a variety of connectors and fasteners that require human dexterity. A guarding system based on 3D sensing could enable industrial engineers to design processes that optimally allocate subtasks to humans and machines in a manner that best exploits their different capabilities while preserving safety.

2D and 3D sensing systems may share underlying technologies. RGB cameras and stereo vision cameras, for example, utilize a lens and sensor combination (i.e., a camera) to capture an image of a scene that is then analyzed algorithmically. A camera-based sensing system typically includes several key components. A light source illuminates the object being inspected or measured. This light source may be part of the camera, as in active sensing systems, or independent of the camera, such as a lamp illuminating the field of view of the camera, or even ambient light. A lens focuses the reflected light from the object and provides a wide field of view. An image sensor (usually a CCD or CMOS array) converts light into electrical signals. A camera module usually integrates the lens, image sensor, and necessary electronics to provide electrical input for further analysis.

The signal from the camera module is fed to an image-capture system, such as a frame grabber, which stores and further processes the 2D or 3D image signal. A processor runs image-analysis software for identification, measurement, and location of objects within the captured scene. Depending on the specific design of the system, the processor can use central-processing units (CPUs), graphics-processing units (GPUs), field-programmable gate arrays (FPGAs), or any number of other architectures, which may be deployed in a stand-alone computer or integrated in the camera module.

2D camera-based methods are well-suited to detecting defects or taking measurements using well-known image-processing techniques, such as edge detection or template matching. 2D sensing is used in unstructured environments and, with the aid of advanced image-processing algorithms, may compensate for varying illumination and shading conditions. However, algorithms for deriving 3D information from 2D images may lack robustness and suitability for safety-critical applications, as their failure modes are hard to characterize.

While a typical image provides 2D information of an object or space, a 3D camera adds another dimension and estimates the distance to objects and other elements in a scene. 3D sensing can therefore provide the 3D contour of an object or space, which can itself be used to create a 3D map of the surrounding environment and position an object relative to this map. Robust 3D vision overcomes many problems of 2D vision, as the depth measurement can be used to easily separate foreground from background. This is particularly useful for scene understanding, where the first step is to segment the subject of interest (foreground) from other parts of the image (background).

A widely-used 3D camera-based sensing approach is stereoscopic vision, or stereo vision. Stereo vision generally uses two spaced-apart cameras in a physical arrangement similar to human eyes. Given a point-like object in space, the camera separation will lead to measurable disparity of the object positions in the two camera images. Using simple pinhole camera geometry, the object's position in 3D can be computed from the images in each of the cameras. This approach is intuitive, but its real-world implementations are often not as simple. For example, features of the target need to be recognized first so that the two images can be compared for triangulation, but feature recognition involves relatively complex computation and may consume substantial processing power.

Further, 3D stereoscopic vision is highly dependent on the background lighting environment, and its effectiveness is degraded by shadows, occlusions, low contrast, lighting changes, or unexpected movements of the object or sensors. Therefore, often more than two sensors will be used to obtain a surrounding view of the target and thereby handle occlusions, or to provide redundancy to compensate for errors caused by a degraded and uncontrolled environment. Another common alternative is the use of structured light patterns to enhance a system's ability to detect features.

Another approach to 3D imaging utilizes lasers or other active light sources and detectors. A light source-detector system is similar to a camera-based system in that it also integrates lens and image sensors and converts optical signals into electrical signals, but there is no image captured. Instead, the image sensor measures the change of position and/or intensity of a tightly-focused light beam—usually a laser beam—over time. This change of position and/or intensity of the detected light beam is used to determine object alignment, throughput, reflective angles, time of flight, or other parameters to create images or maps of the space or object under observation. Light source-detector combinations include active triangulation, structured light, LIDAR, and time-of-flight sensors.

Active triangulation mitigates the environmental limitations of stereoscopic 3D by proactively illuminating objects under study with a narrowly focused light source. The wavelength of the active illumination can be controlled, and the sensors can be designed to ignore light at other wavelengths, thereby reducing ambient light interference. Further, the location of the light source can be changed, allowing the object to be scanned across points and from multiple angles to provide a complete 3D picture of the object.

3D structured light is another approach based on triangulation and an active light source. In this approach, a pre-designed light pattern, such as parallel lines, a grid, or speckles, is beamed on the target. The observed reflected pattern will be distorted by the contour of the target, and the contour as well as the distance to the object can be recovered by analysis of the distortion. Successive projections of coded or phase-shifted patterns are often required to extract a single depth frame, which leads to lower frame rates, which in turn mean that the subject must remain relatively still during the projection sequence to avoid blurring.

Compared to a simple active triangulation, structured light adds "feature points" to the target. As feature points are pre-determined (i.e., spatially encoded) and very recognizable, the structured light approach makes feature recognition easier and triangulation therefore faster and more reliable. This technology shifts complexity from the receiver to the source and requires more sophisticated light sources but simpler sensors and lower computational intensity.

Scanning LIDAR measures the distance to an object or space by illuminating it with a pulsed laser beam and measuring the reflected pulses with a sensor. By scanning the laser beam in 2D and 3D, differences in laser return times and wavelengths can be used to make 2D or 3D representations of the scanned object or space. LIDAR uses ultraviolet (UV), visible, or near-infrared light, which is typically reflected via backscattering to form an image or map of the space or object being under study.

A 3D time-of-flight (ToF) camera works by illuminating the scene with a modulated light source and observing the reflected light. The phase shift between the illumination and the reflection is measured and translated to distance. Unlike LIDAR, the light source is not scanned; instead the entire scene is illuminated simultaneously, resulting in higher frame rates. Typically, the illumination is from a solid-state laser or LED operating in the near-infrared range (—800-1500 nm) invisible to the human eyes. An imaging sensor responsive to the same spectrum receives the light and converts the photonic energy to electrical current, then to charge, and then to a digitized value. The light entering the sensor has a component due to ambient light, and a component from the modulated illumination source. Distance (depth) information is only embedded in the component reflected from the modulated illumination. Therefore, a high ambient component reduces the signal to noise ratio (SNR).

To detect phase shifts between the illumination and the reflection, the light source in a 3D ToF camera is pulsed or modulated by a continuous-wave source, typically a sinusoid or square wave. Distance is measured for every pixel in a 2D addressable array, resulting in a depth map, or collection of 3D points. Alternatively, a depth map can be rendered in a 3D space as a collection of points, or a point cloud. The 3D points can be mathematically connected to form a mesh onto which a textured surface can be mapped.

3D ToF cameras have been used in industrial settings but, to date, the deployments have tended to involve non-safety critical applications such as bin-picking and palletizing. Because existing off-the-shelf 3D ToF cameras are not safety-rated, they cannot be used in safety-critical applications such as machine guarding or collaborative robotics applications. Accordingly, there is a need for architectures and techniques that render 3D cameras, including ToF cameras, useful in applications requiring a high degree of safety and conformance to industry-recognized safety standards.

SUMMARY

Embodiments of the present invention utilize one or more 3D cameras (e.g., ToF cameras) in industrial safety applications. The 3D camera generates a depth map or a point cloud that may be used by external hardware and software to classify objects in a workcell and generate control signals for machinery. Besides meeting functional safety standards, embodiments of the invention can handle the rich, complex data provided by 3D imaging, processing these data to generate effective and reliable control outputs for industrial machinery.

Accordingly, in a first aspect, the invention relates to an image-processing system. In various embodiments, the system comprises first and second 3D sensors each for generating an output array of pixelwise values indicative of distances to objects within a field of view of the sensor, the fields of view of the first and second 3D sensors overlapping along separate optical paths; at least one processor for combining, from each 3D sensor, multiple sequentially obtained output arrays into a single resulting (i.e., combined) output array; first and second depth-compute engines, executable by the processor(s), for processing successive resulting output arrays originating from, respectively, the first and second 3D sensors, into pixelwise arrays of depth values; and a comparison unit, executable by the processor(s), for (i) detecting pixelwise differences in depth between corresponding processed resulting output arrays originating substantially simultaneously from the first and second 3D sensors and (ii) generating an alert signal if the detected differences in depth aggregate to exceed a noise metric. The depth-compute engines operate in a pipelined fashion so as to begin processing a new combined output array prior to completing processing of a previous combined output array In some embodiments, the 3D sensors are time-of-flight (ToF) sensors. The first and second depth-compute engines and the comparison unit may, for example, be executed by a field-programmable gate array.

In various embodiments, the system further comprises at least one temperature sensor, and the 3D sensors are responsive to the temperature sensor(s) and modify their respective output arrays in accordance therewith. Similarly, the system may further comprise at least one humidity sensor, in which case the 3D sensors will be responsive to the humidity sensor(s) and modify their respective output arrays in accordance therewith.

The multiple sequentially obtained output arrays may be combined into a single resulting output array using a dark frame captured by the 3D sensors under no illumination. The output array of pixelwise values may also include an optical intensity value for each value indicative of an estimated distance to an object within the sensor field of view, and the depth-compute engines may compute an error metric for each of the depth values based at least in part on the associated optical intensity value. The the error metric may be further based on sensor noise, dark frame data and/or ambient light or temperature. In some embodiments, each of the depth-compute engines operates in a pipelined fashion whereby, after the execution of each of a plurality of computational processing steps, processing of an oldest combined output array is completed and processing of a newest combined output array is begun.

In some embodiments, the system further comprises a timer for storing a total cumulative operating time of the system. The timer is configured to issue an alert when a predetermined total cumulative operating time has been exceeded. The system may include a voltage monitor for over/under monitoring of all voltage rails of the system and for causing system power to be interrupted upon detection of a failure condition.

In another aspect, the invention pertains to an image-processing system comprising, in various embodiments, a plurality of 3D sensors each for (i) illuminating a field of view of the sensor and (ii) generating an output array of pixelwise values indicative of distances to objects within the illuminated field of view; and a calibration unit for (i) sequentially causing each of the 3D sensors to generate an output array while other 3D sensors are illuminating their fields of view and (ii) creating an interference matrix from the generated output arrays. The interference matrix indicates, for each of the 3D sensors, the degree of interference by other 3D sensors simultaneously active therewith.

The system may further comprise a processor for operating the 3D sensors in accordance with the interference matrix. The processor may suppress, during operation of one of the 3D sensors, simultaneous operation of one or more other 3D sensors. The processor may cause correction of the values obtained by one of the sensors during simultaneous operation of one or more other 3D sensors.

In some embodiments, the system further comprises an external sync for operating the 3D sensors individually without interference. The system may further comprise a timer for storing a total cumulative operating time of the system. The calibration unit may be responsive to the total cumulative operating time and configured to adjust the pixelwise values indicative of distances based thereon.

In various embodiments, the system further comprises at least one temperature sensor, and the calibration unit is responsive to the temperature sensor(s) and configured to adjust the pixelwise values indicative of distances based thereon. Similarly, the system may further comprise at least one humidity sensor, in which case the calibration unit is responsive to the humidity sensor(s) and configured to adjust the pixelwise values indicative of distances based thereon. The system may include a voltage monitor for over/under monitoring of all voltage rails of the system and for causing system power to be interrupted upon detection of a failure condition.

Yet another aspect of the invention relates to an image-processing system comprising, in various embodiments, at least one 3D sensor for generating an output array of pixelwise values, the values including an optical intensity value and a value indicative of an estimated distance to an object within a field of view of the sensor, a processor, and a depth-compute engine, executable by the processor, for processing successive combined output arrays originating from the at least one 3D sensor into a pixelwise array of depth values. Each of the depth values has an associated error metric based at least in part on the associated intensity value. The error metric may be further based on sensor noise, dark frame data, ambient light and/or temperature.

In some embodiments, the system further comprises a controller for operating a machine within a safety envelope. The safety envelope has a volume determined at least in part on the error metric of pixels sensed by the sensor(s) and corresponding to a person proximate to the machine. The system may include a voltage monitor for over/under monitoring of all voltage rails of the system and for causing system power to be interrupted upon detection of a failure condition.

In still another aspect, the invention pertains to a method of generating a digital representation of a 3D space and objects therein and detecting anomalies in the representation. In various embodiments, the method comprises the steps of disposing first and second 3D sensors in or proximate to the space; causing each of the sensors to generate an output array of pixelwise values indicative of distances to objects in the 3D space and within a field of view of the sensor, the fields of view of the first and second 3D sensors overlapping along separate optical paths; computationally combining, from each 3D sensor, multiple sequentially obtained output arrays into a single resulting output array; computationally processing, in a pipelined fashion, successive resulting output arrays originating from, respectively, the first and second 3D sensors, into pixelwise arrays of depth values; detecting pixelwise differences in depth between corresponding processed resulting output arrays originating substantially simultaneously from the first and second 3D sensors; and generating an alert signal if the detected differences in depth aggregate to exceed a noise metric.

The 3D sensors may be time-of-flight (ToF) sensors. In some embodiments, the method also comprises the step of providing at least one temperature sensor and causing the output arrays to be modified in response to an output of the temperature sensor(s). Similarly, in some embodiments, the method further comprises the step of providing at least one humidity sensor and causing the output arrays to be modified in response to an output of the humidity sensor(s).

Multiple sequentially obtained output arrays may be averaged or otherwise combined into a single resulting output array using a dark frame captured by the 3D sensors under no illumination. The output array of pixelwise values may also include an optical intensity value for each value indicative of an estimated distances to an object within a sensor field of view sensor, and the error metric may be based at least in part on the associated optical intensity value. Moreover, the error metric may be further based on sensor noise, dark frame data, ambient light and/or temperature.

In some embodiments, the method further comprises the steps of storing a total cumulative operating time of the system and issuing an alert when a predetermined total cumulative operating time has been exceeded. Execution may be pipelined such that after execution of each of a plurality of computational processing steps, as processing of the oldest combined output array is completed, processing of a newest combined output array is begun.

In yet another aspect, the invention pertains to a method of calibrating a sensor array for 3D depth sensing. In various embodiments, the method comprises the steps of providing a plurality of 3D sensors each for (i) illuminating a field of view of the sensor and (ii) generating an output array of pixelwise values indicative of distances to objects within the illuminated field of view; sequentially causing each of the 3D sensors to generate an output array while other 3D sensors are illuminating their fields of view; and creating an interference matrix from the generated output arrays, the interference matrix indicating, for each of the 3D sensors, a degree of interference by other 3D sensors simultaneously active therewith.

The 3D sensors may be operated in accordance with the interference matrix such that, during operation of one of the 3D sensors, simultaneous operation of one or more other 3D sensors is suppressed and/or the values obtained by one of the sensors during simultaneous operation of one or more other 3D sensors are corrected. The 3D sensors may be externally synchronized so as to operate them individually without interference.

In various embodiments, the method further comprises the step of storing a total cumulative operating time of the system and adjusting the pixelwise values based thereon. The method may further comprise the step of sensing a temperature and/or humidity and adjusting the pixelwise values based thereon.

Still another aspect of the invention pertains to a method of generating a digital representation of a 3D space and objects therein. In various embodiments, the method comprises the steps of providing at least one 3D sensor for generating an output array of pixelwise values, where the values include an optical intensity value and a value indicative of an estimated distances to an object within a field of view of the sensor; and processing successive combined output arrays originating from the 3D sensor(s) into a pixelwise array of depth values, each of the depth values having an associated error metric based at least in part on the associated intensity value.

The error metric may be further based on sensor noise, dark frame data, ambient light and/or temperature. In some embodiments, the method further comprises the step of operating a machine within a safety envelope, the safety envelope having a volume determined at least in part on the error metric of pixels sensed by the at least one sensor and corresponding to a person proximate to the machine.

In general, as used herein, the term "substantially" means ±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

The ensuing discussion describes embodiments involving ToF cameras, but it should be understood that the present invention may utilize any form of 3D sensor capable of recording a scene and assigning depth information, typically on a pixelwise basis, to a recorded scene. Functionally, the 3D camera generates a depth map or a point cloud that may be used by external hardware and software to classify objects in a workcell and generate control signals for machinery.

Figure 1:
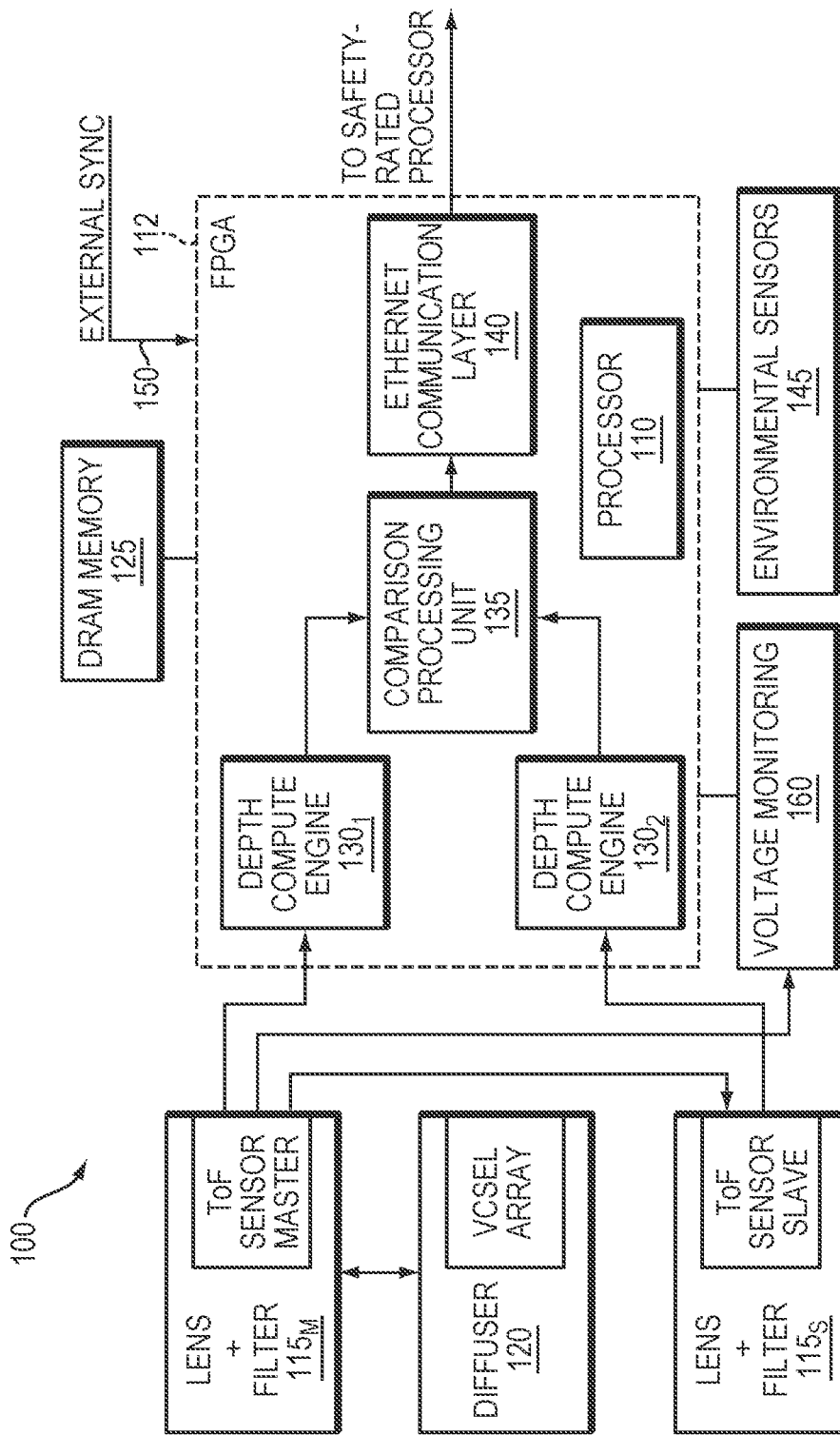
FIG. 1 schematically illustrates a camera architecture in accordance with an embodiment of the invention.

Refer first to FIG. 1, which illustrates a representative system 100 that may be configured as a camera within a single enclosure or as multiple separate components. The system 100, which may be implemented in a single housing as a camera, includes a processing unit 110 and a pair of 3D sensors 115, one of which (sensor 115*m*) operates as a master and the other (sensor 115*s*) as a slave. The camera 100 (or, in some embodiments, each of the sensors 115) also includes a light source (e.g., a VCSEL laser source), suitable lenses and filters tuned to the light source. The reflected and backscattered light from the light source is captured by the lenses and recorded by the sensors 115. The light source may include a diffuser 120, although in low-power applications, a light-emitting diode (LED) may be used instead of a laser source and diffuser.

The processor 110 may be or include any suitable type of computing hardware, e.g., a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

In the illustrated embodiment, the processor 110 operates an FPGA and may advantageously provide features to support safety-rated operation, e.g., Safety Separation Design Flow to lock down place and route for safety-critical portions of the design; clock check; single event upset; CRC functions for various data and communication paths that cross the FPGA boundary; and usage of safety-rated functions for individual sub-modules. Within the processor's integrated memory and/or in a separate, primary random-access memory (RAM) 125 typically dynamic RAM, or DRAM—are instructions, conceptually illustrated as a group of modules that control the operation of the processor 110 and its interaction with the other hardware components. These instructions may be coded in any suitable programming language, including, without limitation, high-level languages such as C, C++, C#, Java, Python, Ruby, Scala, and Lua, utilizing, without limitation, any suitable frameworks and libraries such as TensorFlow, Keras, PyTorch, or Theano. Additionally, the software can be implemented in an assembly language and/or machine language directed to a microprocessor resident on a target device. An operating system (not shown) directs the execution of low-level, basic system functions such as memory allocation, file management and operation of mass storage devices. At a higher level, a pair of conventional depth-compute engines 1301, 1302 receive raw 3D sensor data and assign depth values to each pixel of the recorded scene. Raw data refers to the uncalibrated data coming from a sensor (e.g., 12 bits per pixel).

Using two independent lenses and 3D sensor modules 115 creates two separate optical paths. This redundancy allows for immediate detection if one of the camera modules 115 fails during operation. Also, by not picking up the exact same image from each lens and sensor combination, additional levels of processing can be performed by an image comparison module 135, which projects the response of a pixel from one optical path into corresponding pixels of the other optical path. (This projection may be determined, for example, during a calibration phase.) Failure modes that can be detected through this comparison include errant detections due to multiple reflections and sensor-sensor interference. When the two sensors 115 agree within an established noise metric based on the performance characteristics of the cameras, the two independent images can also be used to reduce noise and/or increase resolution. Redundant sensing for dual-channel imaging ensures that reliability levels required for safety-critical operation in industrial environments can be met.

If the comparison metric computed by the comparison module 135 is within the allowed range, the merged output is processed for output according to a network communication protocol. In the illustrated embodiment, output is provided by a conventional low-latency Ethernet communication layer 140. This output may be utilized by a safety-rated processor system for controlled machinery as described, for example, in U.S. Provisional Application Ser. No. 62/811,070, filed on Feb. 27, 2019, the entire disclosure of which is hereby incorporated by reference.

The system 100 may include one or more environmental sensors 145 to measure conditions such as temperature and humidity. In one embodiment, multiple on-board temperature sensors 145 are disposed at multiple locations across the sensors 115—e.g., at the center of the illumination array, on the camera enclosure, and within the camera enclosure internally (one near the master sensor and one near the slave sensor)—for calibrating and correcting the 3D sensing modules as system-generated heat and ambient temperature changes or drifts affect the camera's operating parameters. For example, camera temperature variations can affect the camera's baseline calibration, accuracy, and operating parameters. Calibration may be employed to establish operating temperature ranges where performance is maintained; sensor detection of conditions outside these ranges can cause a shutdown, preventing dangerous failures. Temperature correction parameters may be estimated during calibration and then applied in real-time during operation. In one embodiment, the system 100 identifies a stable background image and uses this to constantly verify the correctness of the calibration and that the temperature-corrected image remains stable over time.

A fundamental problem with the use of depth sensors in safety-rated systems is that the depth result from each pixel is not known with 100% certainty. The actual distance to an object can differ from the reported depth. For well-illuminated objects, this difference is trivial and can be ignored. However, for less well-illuminated objects, the error between the reported depth and actual depth may become significant, manifesting as a mismatch between an object's actual and apparent location, and this mismatch will be randomized on a per-pixel basis. Pixel-level errors may arise from, for example, raw data saturation or clipping, unresolvable ambiguity distance as calculated by different modulation frequencies, a large intensity mismatch between different modulation frequencies, a predicted measurement error above a certain threshold due to low SNR, or excessive ambient light level. A safety-rated system that needs to know accurate distances cannot afford such errors. The approach taken by typical ToF cameras is to zero out the data for a given pixel if the received intensity is below a certain level. For pixels with medium or low received optical intensity, the system can either conservatively disregard the data and be totally blind for that pixel, or it can accept the camera's reported depth result—which may be off by some distance.

Accordingly, depth data provided in the output may include a predicted measurement error range of the depth result, on a per-pixel basis, based on raw data processing and statistical models. For example, it is common for ToF cameras to output two values per pixel: depth and optical intensity. Intensity can be used as a rough metric of data confidence (i.e., the reciprocal of error), so instead of outputting depth and intensity, the data provided in the output may be depth and an error range. The range error may also be predicted, on a per-pixel basis, based on variables such as sensor noise, dark frame data (as described below), and environmental factors such as ambient light and temperature.

Thus, this approach represents an improvement over simple pass/fail criteria as described above, which ignore all depth data for pixels with a signal-to-noise ratio (SNR) below a threshold. With a simple pass/fail approach, depth data is presented as if there is zero measurement error, so a safety-critical process that relies on the integrity of this data must set the SNR threshold sufficiently high that the actual measurement error has no safety impact at the system level. Pixels with medium to low SNR may still contain useful depth information despite having increased measurement error, and are either completely ignored (at a high SNR threshold) or are used with the incorrect assumption of zero measurement error (at a low SNR threshold). Including the measurement error range on a per-pixel basis allows a higher-level safety-critical process to utilize information from pixels with low to mid SNR levels while properly bounding the depth result from such pixels. This may improve overall system performance and uptime over the simple pass/fail approach, although it should be noted that a pass/fail criterion for very low SNR pixels can still be used with this approach.

In accordance with embodiments hereof, error detection can take different forms with the common objective of preventing erroneous depth results from being propagated to a higher-level safety-critical process, on a per-pixel basis, without simply setting a threshold for the maximum allowable error (or equivalently minimum required intensity). For example, a pixel's depth can be reported as 0 with a corresponding pixel error code. Alternatively, the depth-compute engines 130 can output report the depth along with the expected range error, enabling the downstream safety-rated system to determine whether the error is sufficiently low to permit the pixel to be used.

For example, as described in U.S. Pat. No. 10,099,372, the entire disclosure of which is hereby incorporated by reference, a robot safety protocol may involve modulating the robot's maximum velocity (by which is meant the velocity of the robot itself or any appendage thereof) proportionally to the minimum distance between any point on the robot and any point in the relevant set of sensed objects to be avoided. The robot is allowed to operate at maximum speed when the closest object is further away than some threshold distance beyond which collisions are not a concern, and the robot is halted altogether if an object is within a certain minimum distance. Sufficient margin can be added to the specified distances to account for movement of relevant objects or humans toward the robot at some maximum realistic velocity. Thus, in one approach, an outer envelope or 3D zone is generated computationally around the robot. Outside this zone, all movements of, for example, a detected person are considered safe because, within an operational cycle, they cannot bring the person sufficiently close to the robot to pose a danger. Detection of any portion of the person's body within a second 3D zone, computationally defined within the first zone, does not prohibit the robot from continuing to operate at full speed. But if any portion of the detected person crosses the threshold of the second zone but is still outside a third interior danger zone within the second zone, the robot is signaled to operate at a slower speed. If any portion of the detected person crosses into the innermost danger zone—or is predicted to do so within the next cycle based on a model of human movement—operation of the robot is halted.

In this case, the safety zones may be adjusted (or the space considered occupied by the detected person may be expanded) based on estimated depth errors. The greater the detected error, the larger the envelope of the safety zones or the space assumed to be occupied by the detected person will be. In this way, the robot may continue operating based on error estimates instead of shutting down because too many pixels do not satisfy a pass/fail criterion.

Because any single image of a scene may contain shimmer and noise, in operation, multiple images of a scene are obtained by both sensors 115 in rapid succession following a frame trigger. These "subframes" are then averaged or otherwise combined to produce a single final frame for each sensor 115. The subframe parameters and timing relative to the frame trigger can be programmable at the system level, and can be used to reduce cross-talk between sensors. Programming may include subframe timing to achieve time multiplexing, and also frequency modulation of the carrier.

As indicated in FIG. 1, an external sync 150 for frame-level and, in some cases, subframe triggering may be provided to allow multiple cameras 100 to cover the same scene with safety guarantees, allowing the camera outputs to be interlaced. The frame-level and subframe triggering may use time-sequence multiplexing to avoid interference. One camera 100 may be designated as a master that controls the overall timing of the cameras to ensure that only one is illuminating the scene at a time. This master provides trigger signals to the individual cameras to indicate when they should acquire the next frame or subframe.

Some embodiments utilize a dark frame (i.e., an image of the scene without illumination) for real-time correction of ambient noise and sensor offset. Often a differential measurement technique that uses multiple subframe measurements to cancel out noise sources is effective. However, by using the dark subframe not only as a measurement of ambient levels but also as a measurement of inherent camera noise, the number of subframes required can be decreased, which increases the amount of signal available for each subframe.

Figure 2:
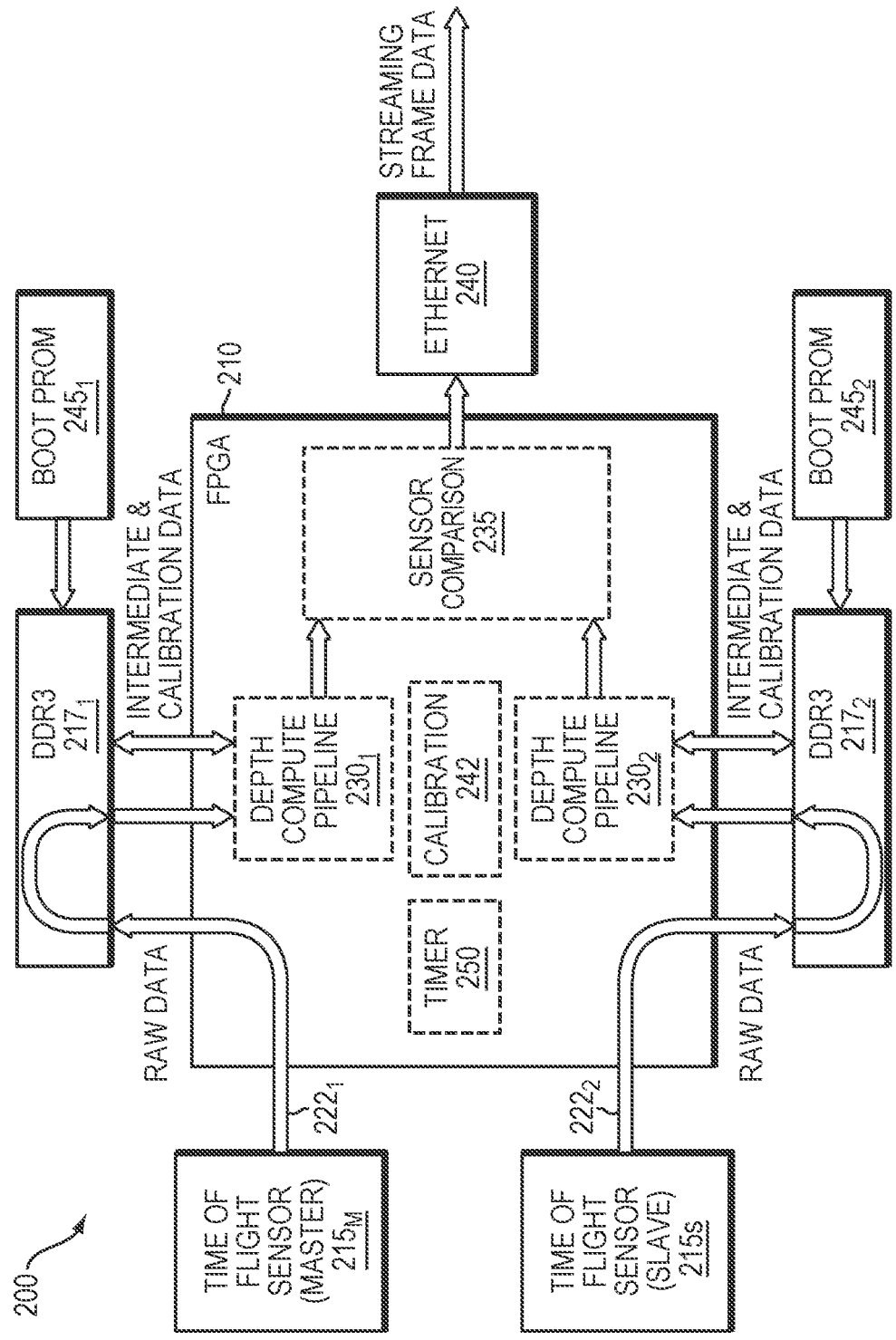
FIG. 2 schematically illustrates the data flow of the embodiment illustrated in FIG. 1.

As illustrated in FIG. 2, a pipeline architecture may be used to facilitate efficient subframe aggregation and processing as the next set of subframes is recorded. The architecture 200 representatively includes an FPGA 210, a pair of master-slave ToF sensors 215*m*, 215*s*, and a plurality of external DDR memory banks 217$_1$, 217$_2$ to support subframe aggregation from captured frame data. As subframes are captured by the sensors 215*m*, 215*s*, they follow a data path 221$_1$, 222$_2$, respectively, accumulating in the DDR memory banks 217 at a rate reflecting the difference between the rate of subframe capture and depth-compute processing.

Each data path 221 may have multiple DDR interfaces with error-correcting code (ECC) support to allow for simultaneous reading and writing of memory, but the two data paths 221 are independent. Each of the depth-compute pipelines $230_1$, $230_2$ operates in a pipelined fashion such that, after each processing step, a new frame can be started as an earlier frame is completed and intermediate frames are stepwise advanced through the processing path. Data relevant to calibration (e.g., temperature data) may be accumulated in the DDR banks 217 from the environmental sensors 145 and passed alongside contemporaneous sensor data to the depth-compute pipelines 230, so that at each processing step, the depth computation is performed in accordance with environmental conditions prevailing when the frame was acquired.

The new images with depth information that emerge after each time step from the depth-compute pipelines are compared by the sensor comparison processing unit 235 as described above and output as Ethernet data. FIG. 2 shows that the Ethernet communication layer 240 can, if desired, be implemented outside the FPGA 210.

In a typical deployment, multiple 3D ToF cameras are mounted and fixed in place around the workspace or object to be measured or imaged. An initial calibration step is performed by a calibration module 242 (shown for convenience as part of the system 200 but more typically implemented externally, e.g., as a stand-alone component) at each 3D ToF camera to correct for structured noise effects including temperature and optical distortions specific to the camera. Other metadata may also be captured, such as the subframe expected background image, which may be used for real-time monitoring of camera measurement stability. Each camera 100 can frame or subframe trigger an exposure by varying illumination frequencies and illumination levels, including the dark level captured by the camera under no illumination. Through the external subframe external sync 150, multiple 3D ToF cameras can be triggered at different frequencies and illumination levels to minimize interference and lower the latency of all the 3D ToF cameras in the workcell. By having a master that controls the overall timing of the cameras (to ensure that only one is illuminating the scene at a time), latency between all the cameras can be reduced and acquisition frequency increased.

Data flows from each sensor 215 through a data reception path in the FPGA 210 and into the associated DDR 217. The data is stored in the DDR 217 at a subframe level. Once a depth-compute engine 230 recognizes that a full subframe has accumulated in the associated DDR 217, it starts pulling data therefrom. Those pixels flow through the depth-compute engine 230 and are stored back in the associated DDR 217 as single-frequency depth values. These contain ambiguous depth results that need to be resolved later in the pipeline via comparison. Accordingly, as soon as the first three subframes needed for calculating the first single-frequency result are available in the DDR 217, the associated depth-compute engine will begin calculating the ambiguous depth on a pixelwise basis using those three subframes. While this is happening, the following three subframes for the second single-frequency result are loaded from sensor 215 into memory, and as subframe queues empty, they receive previously loaded data so that no processing cycles are wasted on fetches. Once the first single-frequency result is calculated and fully loaded into memory, the depth-compute engine will begin calculating the second single-frequency depth result in a similar fashion. Meanwhile the third set of subframes is loaded into memory.

However, rather than loading the second single-frequency depth result into memory as it is calculated, it is processed along with the first single-frequency depth result on a pixelwise basis to produce an unambiguous depth result. This result is then stored in memory as an intermediate value until it can be further compared to the second unambiguous depth result obtained from the third and fourth single-frequency depth results. This process is repeated until all the relevant subframes are processed. As a last step, all intermediate results are read from the DDR and final depth and intensity values are calculated.

Calibration can adjust not only for camera-specific performance differences but characterizing interference between cameras in a multiple-camera configuration. During initialization, one camera at a time illuminates the scene and other cameras determine how much signal is received. This procedure facilitates creation of an interference matrix, which may be stored in the DDR 217, that determines which cameras can illuminate at the same time. Alternatively, this approach can also be used to create a real-time correction similar to cross-talk correction techniques used for electronic signal transmission. In particular, the FPGAs 112 of multiple cameras may cooperate with each other (in, for example, an ad hoc network or with one camera designated as the master and the others operating as slaves) to sequentially cause each of the cameras to generate an output while the other cameras are illuminating their fields of view, and may share the resulting information to build up, and share, the interference matrix from the generated outputs. Alternatively, these tasks may be performed by a supervisory controller that operates all cameras.

Camera parameters such as temperature, distortion, and other metadata are captured during calibration and stored in the DDRs 217; these are used during real-time recalibration and camera operation. The calibration data contains the sensor's optical characteristics. The depth-compute pipeline utilizes these data along with the streaming frame data as well as data characterizing the sensor's fixed noise properties in computing depth and error as described above. Camera-specific calibration data is collected at the fabrication stage and uploaded to the DDR3 storage from a non-volatile PROM $245_1$, $245_2$ at camera startup. During run time, the depth-compute engine 230 accesses the calibration data in real time from DDR3 memory as needed. In particular, real-time recalibration adjusts, in a conventional fashion, for drift of operating parameters such as temperature or illumination levels during operation. Health and status monitoring information may also be sent after every frame of depth data, and may include elements such as temperatures, pipeline error codes, and FPGA processing latency margins as needed for real-time recalibration.

An operating timer 250 (once again shown as an internal component for convenience, but which may be implemented externally) may be included to keep track of the hours of camera operation, periodically sending this data to the user via the communication layer 240. The calibration unit 242 may also receive this information to adjust operating parameters as the camera illumination system and other components age. Moreover, once the aging limit for VCSELs is reached, the timer 250 may produce an error condition to alert the user that maintenance is required.

The features described above address various possible failure modes of conventional 3D cameras or sensing systems, such as multiple exposures or common mode failures, enabling operation in safety-rated systems. The system may include additional features for safety-rated operation. One such feature is over/under monitoring of every voltage rail by a voltage monitor 160 (see FIG. 1) so that, if a failure condition is detected, the camera may be turned off immediately. Another is the use of a safety-rated protocol for data transmission between the different elements of the 3D ToF camera and the external environment, including the external sync. Broadly speaking, a safety-rated protocol will include some error checking to ensure that bad data does not get propagated through the system. It is possible to create a safety-rated protocol around a common protocol, such as UDP, which supports high bandwidths but is not inherently reliable. This is accomplished by adding safety features such as packet enumeration, CRC error detection, and frame ID tagging. These assure that the current depth frame is the correct depth frame for further downstream processing after the frame data is output from the camera.

Certain embodiments of the present invention are described above. It is, however, expressly noted that the present invention is not limited to those embodiments; rather, additions and modifications to what is expressly described herein are also included within the scope of the invention.

What is claimed is:

1. An image-processing system comprising:
    a plurality of 3D sensors each for (i) illuminating a field of view of the sensor and (ii) generating an output array of pixelwise values indicative of distances to objects within the illuminated field of view; and
    a calibration unit for (i) sequentially causing each of the 3D sensors to generate an output array while other 3D sensors are illuminating their fields of view and (ii) creating and computationally storing an interference matrix from the generated output arrays, the interference matrix indicating, for each of the 3D sensors, a degree of interference by other 3D sensors simultaneously active therewith.

2. The system of claim 1, further comprising a processor for operating the 3D sensors in accordance with the interference matrix, the processor being configured to suppress, during operation of one of the 3D sensors, simultaneous operation of one or more other 3D sensors.

3. The system of claim 1, further comprising a processor for operating the 3D sensors in accordance with the interference matrix, the processor being configured to cause correction of the values obtained by one of the sensors during simultaneous operation of one or more other 3D sensors.

4. The system of claim 1, further comprising an external sync for operating the 3D sensors individually without interference.

5. The system of claim 1, further comprising a timer for storing a total cumulative operating time of the system, the calibration unit being responsive to the total cumulative operating time and configured to adjust the pixelwise values indicative of distances based thereon.

6. The system of claim 1, further comprising at least one temperature sensor, the calibration unit being responsive to the at least one temperature sensor and configured to adjust the pixelwise values indicative of distances based thereon.

7. The system of claim 1, further comprising at least one humidity sensor, the calibration unit being responsive to the at least one humidity sensor and configured to adjust the pixelwise values indicative of distances based thereon.

8. The system of claim 1, further comprising a voltage monitor for over/under monitoring of all voltage rails of the system and interrupting system power upon detection of a failure condition.

9. A method of calibrating a sensor array for 3D depth sensing, the method comprising the steps of:
    providing a plurality of 3D sensors each for (i) illuminating a field of view of the sensor and (ii) generating an output array of pixelwise values indicative of distances to objects within the illuminated a field of view;
    sequentially causing each of the 3D sensors to generate an output array while other 3D sensors are illuminating their fields of view; and
    creating and computationally storing an interference matrix from the generated output arrays, the interference matrix indicating, for each of the 3D sensors, a degree of interference by other 3D sensors simultaneously active therewith.

10. The method of claim 9, further comprising the step of operating the 3D sensors in accordance with the interference matrix and suppressing, during operation of one of the 3D sensors, simultaneous operation of one or more other 3D sensors.

11. The method of claim 9, further comprising the step of operating the 3D sensors in accordance with the interference matrix and causing correction of the values obtained by one of the sensors during simultaneous operation of one or more other 3D sensors.

12. The method of claim 9, further comprising the step of externally synchronizing the 3D sensors so as to operate them individually without interference.

13. The method of claim 9, further comprising the step of storing a total cumulative operating time of the system and adjusting the pixelwise values based thereon.

14. The method of claim 9, further comprising the step of sensing a temperature and adjusting the pixelwise values based thereon.

15. The method of claim 9, further comprising the step of sensing a humidity and adjusting the pixelwise values based thereon.

* * * * *